May 12, 1964
H. E. BALSIGER
3,132,454
PRESSURE CLAMPS FOR RING-LIKE WORKPIECES
Filed Dec. 2, 1960
3 Sheets-Sheet 3
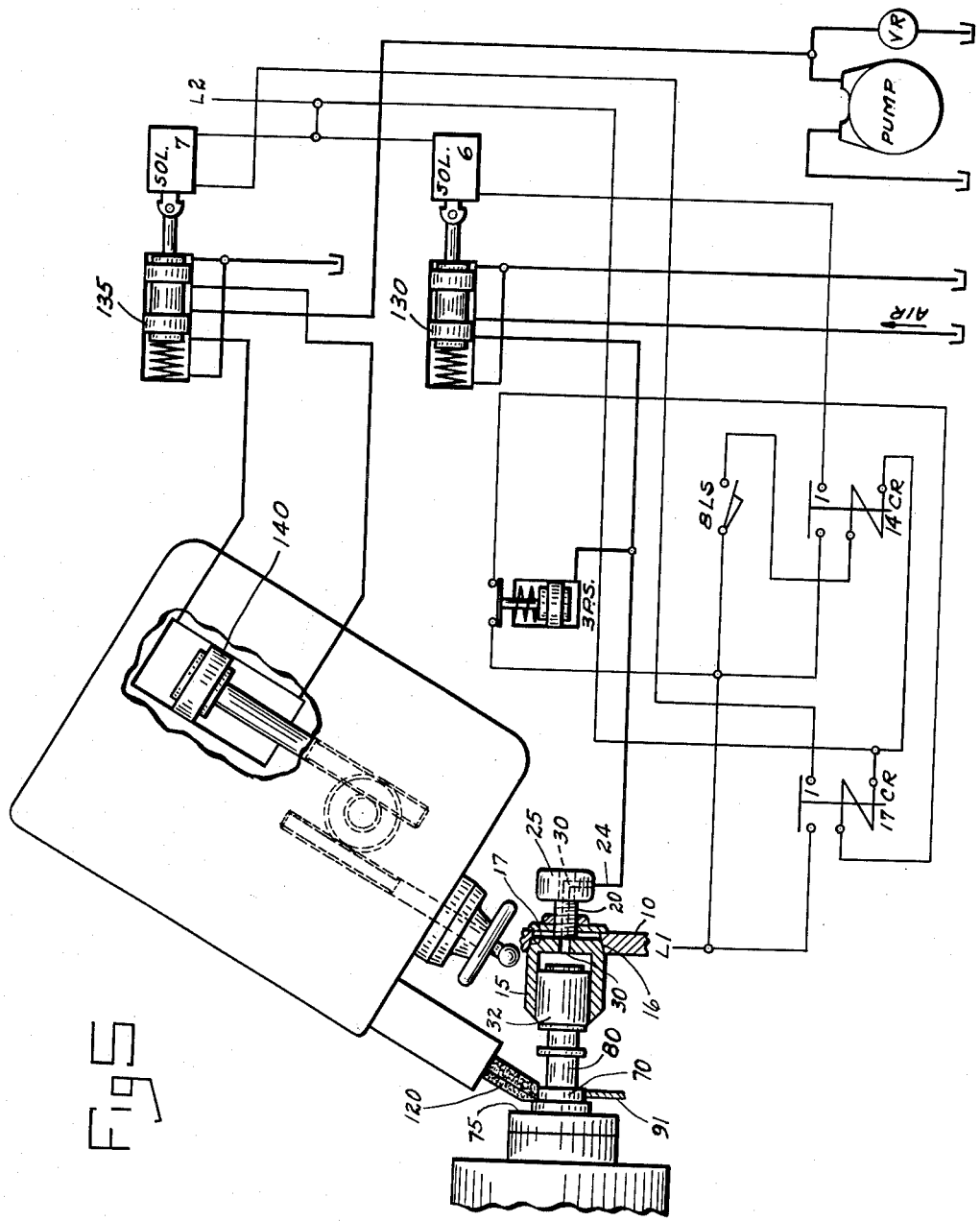
INVENTOR
*HAROLD E. BALSIGER*
BY
*Hugh M Rockey*
ATTORNEY

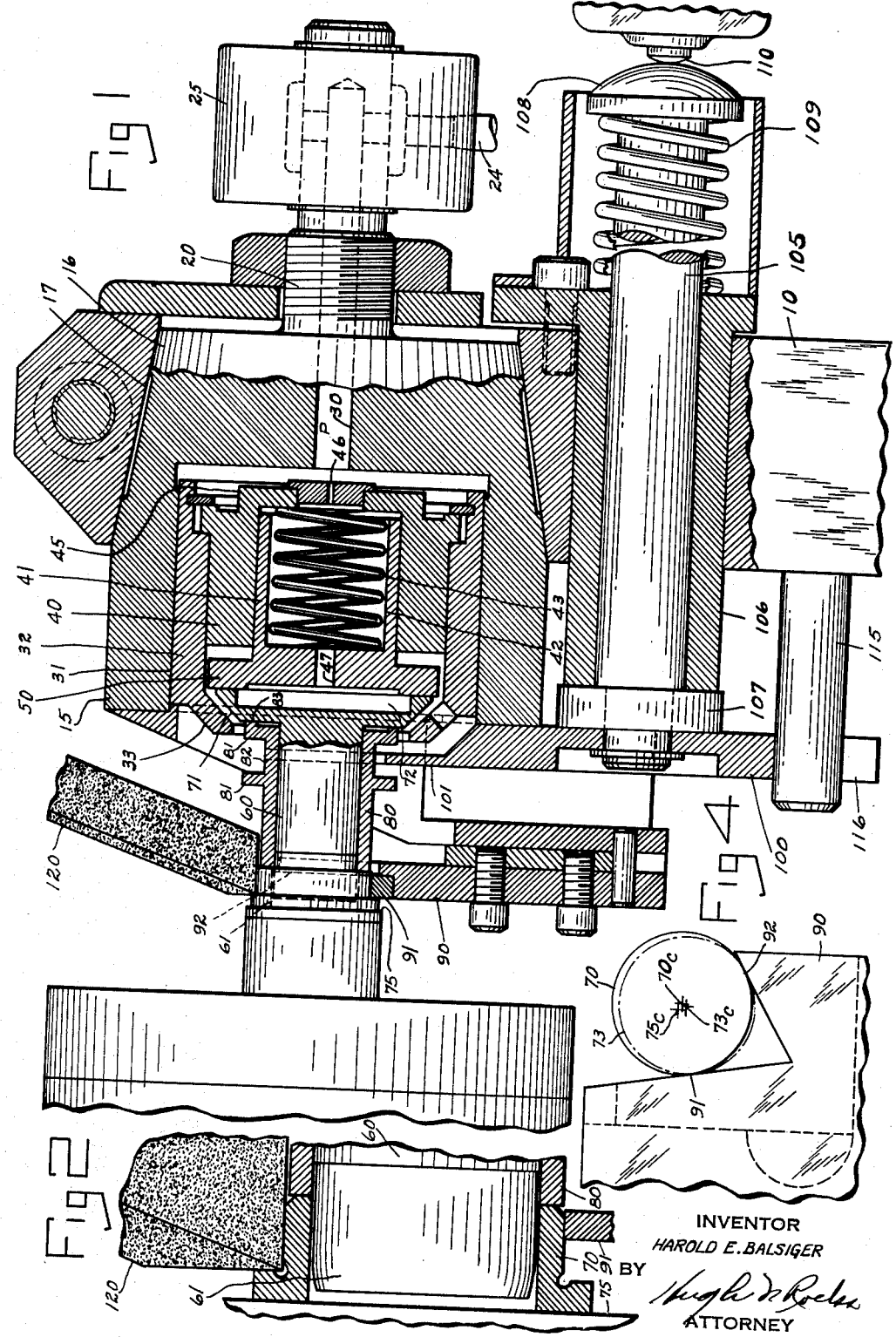

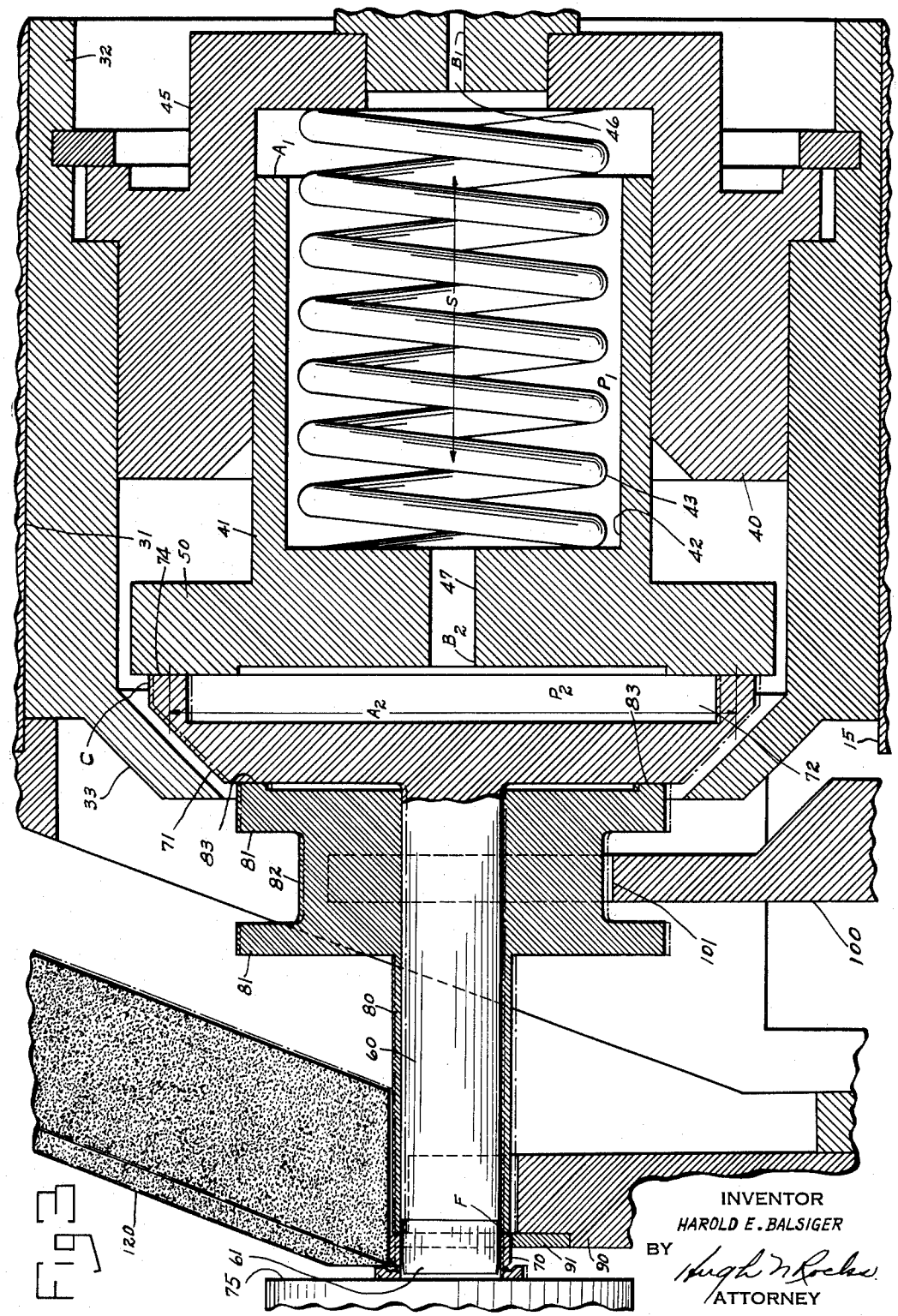

United States Patent Office 3,132,454
Patented May 12, 1964

3,132,454
PRESSURE CLAMPS FOR RING-LIKE
WORKPIECES
Harold E. Balsiger, Waynesboro, Pa., assignor to Landis Tool Company, Waynesboro, Pa.
Filed Dec. 2, 1960, Ser. No. 73,389
7 Claims. (Cl. 51—236)

This invention relates to the grinding of ring-like workpieces such as anti-friction bearing rings, and particularly to means for holding such workpieces against a driving member during a grinding operation.

Anti-friction bearing rings of the type referred to here may be non-magnetic pieces or of a size generally classified as miniatures. Where the work is driven by a magnetic face plate, the contact surface of such workpieces is so small that the magnetic attraction is not sufficient to hold a workpiece against the action of the grinding wheel.

It is, therefore, an object of the present invention to provide pressure operated clamping means for holding a workpiece against a face plate.

The grinding operation performed is on the outside diameter of the workpiece. If the work support is applied to the surface being ground, there is a lateral shifting of the workpiece as its diameter becomes smaller. The clamping member must be centered on the workpiece in order that the clamp and workpiece will turn on a common center.

Another object, therefore, is to provide a clamping member which can move radially with the workpiece while holding the workpiece against the face plate.

The term "clamping member" as used in this specification, relates to the moving element of a work holding device in which the stationary element is the face plate.

FIG. 1 is an enlarged structural view of a loading arm and clamping member showing the work supporting and rotating members in operative relation with the workpiece and grinding wheel.

FIG. 2 is a partial sectional elevation on a larger scale showing the same relation between the various parts.

FIG. 3 is an enlarged sectional view of the clamping member showing the lateral position of the various parts for a rough size and a finish size workpiece.

FIG. 4 shows in diagrammatic form the relation between the work supporting members and a ground and unground workpiece.

FIG. 5 is a hydraulic and electric circuit.

This invention is part of a grinding machine similar to those shown in U.S. Patent 2,694,883, granted November 23, 1954, U.S. Patent 2,826,017, granted March 11, 1958, and U.S. Patent 2,874,518, granted February 24, 1959. However, the work engaging members on the arms of the above mentioned patents merely provide a radial support for the workpiece, the clamping being done by a magnetic face plate.

The present invention includes similar work engaging members plus a pressure operated axial clamping member.

Housing 15 having a tapered portion 16 is mounted in a tapered bore 17 in arm 10. Housing 15 has a threaded portion 20 by which it is secured to arm 10. Beyond portion 20 is mounted a collector ring 25 through which fluid under pressure is directed to passage 30 in housing 15. Housing 15 has a recess 31 in which is mounted sleeve cylinder 32 having a conical portion 33 at one end. Within sleeve cylinder 32 and attached to said sleeve cylinder is a short cylindrical member 40 in which is slidably mounted a piston 41. Piston 41 has a recess 42 in which there is a spring 43, one end of which bears against the end of recess 42, the other end of which bears against end portion 45 of cylindrical member 40. Piston 41 has an end portion 50 larger than the open end of said piston, but slightly smaller in diameter than the inside of sleeve cylinder 32.

Restricted passage 46 in end portion 45 admits fluid under pressure from passage 30 into recess 42 in piston 41. A larger restriction 47 in end portion 50 of piston 41 permits fluid to be discharged from piston 41.

Work engaging arbor 60 is a piston having a portion 61 at its outer end of a diameter slightly smaller than the inside diameter of workpiece 70, and also has a conical flange portion 71 shaped to co-act with the inner face of conical portion 33 of sleeve cylinder 32 to center arbor 60 relative to a workpiece which it is to remove from a work feeding chute as shown in U.S. Patent 2,874,-518. Flange portion 71 has a recess 72 formed therein to provide a chamber with end portion 50 of piston 41 serving as one side thereof. Fluid under pressure supplied through restriction 47 separates arbor 60 from piston 41 by urging said piston 41 to the right against spring 43, leaving arbor 60 to rotate with the workpiece free of frictional resistance from piston 41.

Sleeve 80 slidably mounted on arbor 60 extends beyond the end of arbor 60 to engage and hold a workpiece against face plate 75. Spaced flange portions 81 provide a groove 82 by which sleeve 80 may be moved endwise to remove workpiece 70 from arbor 60. Flange portion 81 at the end of sleeve 80 is relieved so that only an annular portion 83 engages the face of flange portion 71 of arbor 60.

Work supporting member 90 (FIG. 4) is attached to housing 15 and has formed at suitable angles thereon, work engaging surfaces 91 and 92. In FIG. 4, is shown an enlarged circle representing a rough workpiece 70 having a center 70c, and a smaller dot and dash circle representing a ground workpiece 73 having a center 73c. The center of rotation of face plate 75 is shown at 75c. The relative position of said centers indicates the direction of movement of the workpiece on member 90 as it is reduced in size. In FIG. 3, the corresponding movement of sleeve 80, arbor 60, and flange portion 71 is shown by the dot and dash lines.

The means for ejecting a workpiece 70 from portion 61 of arbor 60 is a plate 100 having a fork portion 101 in groove 82 of sleeve 80. Plate 100 is attached to plunger 105 slidably mounted in sleeve 106 in arm 10 and having a collar 107 to limit its movement in sleeve 106. Plunger 105 has a head 108. Spring 109 is mounted on plate 100 with one end against sleeve 106 and the other end against head 108. Plunger 105 is actuated by a cam (not shown) in engagement with head 108. Head 108 is shown in operative relation with a signal transmitting member 110 which may be a limit switch, air nozzle or equivalent devices, the purpose of which is to prevent advance of grinding wheel 120 when arm 10 is down and there is no workpiece in the machine, and sleeve 80 is in the path of grinding wheel 120.

When sleeve 80 is in the left hand or ejecting position, a guide is provided for plate 100 in the form of a pin 115 and arm 10. Guide pin 115 passes through opening 116 in plate 100.

Operation

When arm 10 swings downwardly to place workpiece 70 in operative relation to face plate 75, spring 43 is urging piston 41 against flange portion 71 of arbor 60. Flange portion 71 engages the conical portion 33 of sleeve cylinder 32. With the adjacent surfaces of portions 71 and 33 in contact, arbor 60 is held in axial alignment with a workpiece in a feed chute (not shown) to engage and transfer said workpiece to face plate 75. When arm 10 reaches operative position, it closes limit switch 8LS which acts through control relay 14CR to energize clamp valve solenoid 6. Valve 130 directs fluid under pressure through supply line 24 in collector ring 25 to passage 30 in housing 15. Said fluid under pressure advances sleeve cylinder 32 to the left. Piston 41 is prevented from moving with sleeve cylinder 32 because sleeve 80 on arbor 60 is holding workpiece 70 against face plate 75. The movement of sleeve cylinder 32 separates conical portion 33 from conical flange portion 71. At the same time, fluid under pressure from passage 30 passes through restricted passage 46 into recess 42 in piston 41 and through restriction 47 from piston 41 into the chamber formed between the end portion 50 of piston 41 and recess 72 in flange portion 71 of arbor 60. This pressure serves to move piston 41 to the right, separating said piston 41 from flange portion 71. The flow of air from between piston 41 and flange portion 71 provides an air bearing which permits frictionless rotation of arbor 60 with workpiece 70 with said arbor free of contact with any of the adjacent elements except the workpiece. The space between the conical surfaces of portions 33 and 71 permits the radial movement of arbor 60 to follow the work as its diameter is reduced.

The pressure acting on piston 41 also operates pressure switch 3PS in the circuit to infeed relay 17CR. Relay contact 17CR1 completes a circuit to energize infeed valve solenoid 7, shifting infeed valve 135 to the left to direct fluid under pressure to the upper end of infeed cylinder 140 to advance grinding wheel 120 for a grinding operation.

Recess 72 provides an area of uniform pressure against the greater part of flange portion 71 to separate the co-acting surfaces of flange portion 71 and end portion 50 of piston 41. A pressure varying from that of recess 72 to that of atmosphere exists between said co-acting surfaces. Atmospheric pressure exists outside the end portion 50 of piston 41 and flange portion 71 of arbor 60. The uniform pressure over the greater portion of flange portion 71 serves as a stabilizing force to maintain uniform spacing between said co-acting surfaces and thus to eliminate frictional resistance between the adjacent surfaces of portions 50 and 71.

Air escapes between the face of end portion 50 of piston 41 and the annular contact surface 74 of flange portion 71 to provide an air bearing between portions 50 and 71, and permitting arbor 60 and sleeve 80 to rotate with workpiece 70 and to move laterally relative to the face of end portion 50.

In order to determine the forces and dimensions involved in the construction and operation of the above described clamp, formulae involving the following symbols are used:

$P_2$ is the pressure in p.s.i. in recess 72.
$P_1$ is the pressure in p.s.i. in recess 42.
P is the pressure in p.s.i. in passage 30.
S is the force of spring 43.
$A_2$ is the mean area of the O.D. of flange portion 71 and the I.D. of recess 72.
$A_1$ is the area of piston 41.
C is the mean circumference of the annular contact surface 74 of flange portion 71.
$B_2$ is the area of restriction 47.
$B_1$ is the area of restricted passage 46.
F is the force required to hold a workpiece against face plate 75 which may be determined by trial and error or experience.

When force F is known, the means for providing such force may be determined in the selection of area $A_2$ and pressure $P_2$ required to produce force F on area $A_2$.

The dimension X, the thickness of the air film between contact surface 74 and the co-acting surface of end portion 50, is also determined by trial and error or experience.

Pressure $P_1$ at the right hand end of piston 41 is dependent upon the desired air film thickness.

Pressure P required to maintain pressures $P_1$ and $P_2$ depends upon the size of restrictions $B_1$ and $B_2$.

Area $A_2$ is selected depending upon the space and pressure available.

Area $A_1$ must bear a predetermined relation to area $A_2$ expressed by the equation:

$$\frac{A_2}{A_1} = \frac{FP_1}{P_2(F-S)}$$

The area of restriction $B_1$ may be determined by the difference between pressures P and $P_1$ and the value of X and the volume of air required for the selected value of X.

The area of restriction $B_2$ must bear a relation to restriction $B_1$ expressed by the equation:

$$\frac{B_2}{B_1} = \frac{P-P_1}{P_1-P_2}$$

The force of spring S may be determined by the equation:

$$S = F - A_1 P_1$$

The pressures P, $P_1$ and $P_2$ may be determined from the following equations:

$$P_2 = \frac{F}{A_2}$$

or $$P_1 = \frac{C X P_2}{B_2} + P_2$$

or $$P = \frac{B_2}{B_1}(P_1 - P_2) + P_1$$

or, for static conditions $$P = \frac{S}{A_2 - A_1}$$

I claim:
1. Means for holding a ring-like workpiece in a machine tool for machining the external peripheral surface of said workpiece, a rotatable face plate, a rotatable arbor mounted independently of said face plate for holding the workpiece against said face plate, a flange portion on said arbor, a cylinder for containing said arbor and having a portion of smaller diameter than said flange portion to limit the movement of said arbor in the direction of said face plate, a piston in said cylinder, a spring for holding said piston against said arbor, means for introducing fluid under pressure between said piston and said arbor to hold said arbor against said face plate and to separate said piston from said arbor whereby said arbor may rotate with said workpiece as a unit unhindered by said piston.

2. In a machine for grinding the external peripheral surfaces of ring-like workpieces, a rotatable face plate to drive a workpiece, means mounted independently of said face plate for holding a workpiece against said face plate comprising an arbor movable axially relative to said face plate and having means for engaging the end surface of said workpiece, a cylinder enclosing the end of said arbor, a piston in said cylinder for urging said arbor in the direction of said face plate, peripherally spaced shoes for engaging said external peripheral surface so that said workpiece moves radially as it becomes smaller in diameter, means to introduce fluid under pressure between said piston and said arbor so that said arbor holds said workpiece against said face plate by fluid pressure rather than by spring pressure of said piston and so that said arbor rotates with said workpiece, free of contact with said piston, the relation between said cylinder diameter and said arbor diameter being such as to permit limited radial movement of said arbor in order for said arbor to move with said workpiece as the radial position of said workpiece changes due to change in its diameter from grinding.

3. In a machine for grinding the external peripheral surfaces of a ring-like workpiece, a rotatable face plate to drive said workpiece, means for holding said workpiece against said face plate comprising a separately mounted rotatable arbor movable axially relative to said face plate for engaging the end surface of said workpiece, a cylinder enclosing one end of said arbor, means in said cylinder for urging said arbor in the direction of said face plate including a spring operated piston, co-acting annular surfaces on said arbor and said piston, a supply of fluid under pressure, a passage in said piston for discharging said fluid under pressure between said co-acting surfaces of said piston and said arbor so as to hold said parts in a predetermined spaced relation whereby to provide a flow of fluid under pressure between said piston and arbor and to provide a substantially frictionless rotation of said arbor with said workpiece.

4. Means for supporting and rotating a ring-like workpiece comprising a rotatable face plate, means for holding a workpiece in operative relation to said face plate including a work supporting member having peripherally spaced work engaging portions, an arbor movable axially relative to said work supporting member, said arbor having a flange portion, a conical portion on said flange portion, means on said arbor for engaging the end surface of a workpiece, a cylinder enclosing said flange portion and having a conical portion adjacent said conical portion of said flange portion, the diameter of said flange portion being substantially less than the diameter of said cylinder to permit radial movement of said arbor with a workpiece, a piston in said cylinder, resilient means acting on said piston for effecting contact between said piston and said arbor to center said arbor by engagement of said adjacent conical surfaces of said arbor and said cylinder, means to direct fluid under pressure through said piston to said arbor to separate said piston and said arbor by a film of fluid under pressure whereby said arbor rotates from said workpiece free of frictional resistance with said piston.

5. In a grinding machine, a rotatable face plate, a clamp comprising a free rotating clamping member mounted independently of said face plate and co-acting with said face plate to clamp a workpiece, a fluid pressure supply, a piston, a spring acting on said piston in the direction of said face plate, means to direct said fluid under pressure against said piston in the same direction as said spring, said piston and said clamping member having co-acting bearing surfaces, the effective area of said co-acting bearing surfaces being larger than the area of the other end of said piston, means to direct fluid between said co-acting bearing surfaces whereby said fluid under pressure overcomes the force of said spring and the pressure on said other end of said piston to separate said bearing surfaces as indicated by the formula $$P = \frac{S}{A_2 - A_1}$$

where S is the force exerted by the spring, $A_1$ is the area of the small end of the piston, $A_2$ is the area of the large end of said piston, and P is the operating pressure per unit of area.

6. Means for supporting and rotating a ring-like workpiece for a machining operation comprising a rotatable face plate, a work supporting member having peripherally spaced work engaging portions for engaging the external surface being ground so that the workpiece moves radially as it is ground to a smaller diameter, an arbor movable axially relative to said work supporting member for holding a workpiece against said face plate, a cylinder enclosing said arbor, a piston in said cylinder, means acting on said piston in the direction of said face plate for holding said arbor and said workpiece in operative relation with said face plate, means to direct fluid under pressure between said piston and said arbor to separate said piston and said arbor whereby said arbor will rotate and move radially with said workpiece free of contact with said piston and said cylinder.

7. In a machine for grinding the external peripheral surfaces of ring-like workpieces, a rotatable face plate, a cylinder, an arbor mounted in said cylinder and having means for engaging and holding a workpiece against said face plate, a piston in said cylinder, resilient means acting on said piston to cause said piston to engage and urge said arbor in the direction of said face plate, the respective diameters of said cylinder and said arbor being such that said arbor has a limited radial movement in said cylinder, a supply of fluid under pressure and a passage in said piston for directing fluid under pressure to separate said piston and said arbor axially so that said arbor and said workpiece are free to rotate with said face plate.

References Cited in the file of this patent

UNITED STATES PATENTS

| | | |
|---|---|---|
| 1,024,882 | Domizi | Apr. 30, 1912 |
| 2,955,391 | Fred | Oct. 11, 1960 |
| 2,976,650 | Steinhard | Mar. 28, 1961 |
| 2,979,870 | Pollard et al. | Apr. 18, 1961 |